United States Patent
Porat

[11] Patent Number: 5,483,304
[45] Date of Patent: Jan. 9, 1996

[54] MULTIFOCAL CONTACT LENS

[75] Inventor: Menachem Porat, Kibbutz Hanita, Israel

[73] Assignee: Hanita Lenses, Israel

[21] Appl. No.: 101,952

[22] Filed: Aug. 4, 1993

Related U.S. Application Data

[63] Continuation-in-part of Ser. No. 919,807, Jul. 24, 1992, abandoned.

[30] Foreign Application Priority Data

Jul. 26, 1991 [IL] Israel ............................................ 98971

[51] Int. Cl.⁶ ...................................................... G02C 7/04
[52] U.S. Cl. ...................................................... 351/161
[58] Field of Search ............................ 351/160 R, 160 H, 351/161, 162

[56] References Cited

U.S. PATENT DOCUMENTS

| | | | |
|---|---|---|---|
| 3,279,878 | 10/1966 | Long | 351/161 |
| 4,211,476 | 7/1980 | Brummel et al. | |
| 4,268,133 | 5/1981 | Fischer et al. | 351/161 |
| 4,353,849 | 10/1982 | Lewison | 351/161 |
| 4,854,089 | 8/1989 | Morales | 351/161 |

FOREIGN PATENT DOCUMENTS

| | | | |
|---|---|---|---|
| 0102223 | 3/1984 | European Pat. Off. | B02C 7/04 |
| 2340560 | 9/1977 | France | G02C 7/04 |

OTHER PUBLICATIONS

Tajiri, Akira; "Dimple Contact Lenses"; *American Journal of Optometry & Archives;* vol. 42, No. 4; Apr. 1965; pp. 248–249.

Primary Examiner—Scott J. Sugarman
Attorney, Agent, or Firm—Pennie & Edmonds

[57] ABSTRACT

A multifocal contact lens, having a rear surface configured to float on a tear film covering the user's cornea, a front surface comprised of at least two contiguous surface segments, an upper surface segment optically configured to serve for distance vision and a lower surface segment optically configured to serve for near vision. In at least one peripheral zone of the lens there is provided at least one recess constituting a preferred escape aperture for parts of the tear film displaced when the contact lens slides down the user's cornea, to the effect of substantially preventing rotation of the contact tens during lens translation.

10 Claims, 2 Drawing Sheets

MULTIFOCAL CONTACT LENS

RELATED APPLICATION

This is a continuation-in-part application of U.S. Ser. No. 07/919,807, filed Jul. 24, 1992, now abandoned.

FIELD OF THE INVENTION

The present invention relates to a bi- or multifocal contact lens.

BACKGROUND OF THE INVENTION

The lens is of the type that is pushed up the cornea by the lower eyelid upon downgazing for near vision, and settles back, due to gravity, upon looking up for distance vision. This translational movement of the lens relative to the pupil is necessary in order for the pupil to be located behind the upper part of the lens for distance vision, and behind the lower part of the lens for near vision.

A major problem encountered with these lenses is that of stability of their angular orientation, so that after intentional translation, or translation caused by involuntary blinking, the lens will automatically return to its proper orientation, in which the distance-vision half of the lens is indeed the upper half and the near-vision half, the lower half, with the border line between the two halves in a substantially horizontal orientation.

In prior art lenses, attempts were made to solve this problem by making the lower half of the lens much heavier, as it were ballasting it, and also truncating the lower edge of the lens. While the general orientation of the moving lens was helped by the ballasted lower part, final alignment was left to the flat edge portion produced by the truncation, which portion, when coming in contact with the lower eyelid, was supposed to bring about precise orientation.

These lenses, mainly due to their excessive weight and bulk, proved to be very uncomfortable and a significant proportion of patients could not use them at all, or when wearing them, did not derive much benefit from them.

U.S. Pat. No. 4,268,133 (Fischer, et al.) discloses a contact lens which is claimed to be self-orienting without the help of ballasting or truncation as discussed above. This is said to have been achieved by the provision, at a marginal region intended to be the topmost region when the lens is properly oriented, of one or more raised or recessed characters (such as, e.g., x'es), care being taken for these characters not to intersect the edge of the lens.

SUMMARY OF THE INVENTION

It is one of the objects of the present invention to provide a bifocal or multifocal contact lens that, for all practical purposes, is not heavier than a conventional monofocal contact lens, is comfortable to wear, and provides the translation necessary for satisfactory alternating vision.

According to the invention, this is achieved by providing a multifocal contact lens comprising a near surface configured to float on a tear film covering the user's cornea and a front surface comprised of at least two contiguous surface segments, an upper surface segment optically configured to serve for distance vision and a lower surface segment optically configured to serve for near vision, characterized in that, in at least one peripheral zone of said lens, there is provided at least one recess constituting a preferred escape aperture for parts of said tear film displaced when said contact lens slides down the user's cornea, to the effect of substantially preventing rotation of said contact lens during lens translation, as well as of optimizing said translation.

BRIEF DESCRIPTION OF THE DRAWINGS

The invention will now be described in connection with certain preferred embodiments, with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those. skilled in the art how the several forms of the invention may be embodied in practice.

In the drawings:

FIG. 1 is a frontal view of a first embodiment of the contact lens according to the invention;

FIG. 2 is a cross-sectional view of the lens of FIG. 1;

FIG. 3 is a frontal view of a second embodiment of the contact lens;

FIG. 4 is a cross-sectional view of the lens of FIG. 3;

FIG. 5 is a frontal view of a third embodiment of the contact lens;

FIG. 6 is a cross-sectional view of the lens of FIG. 5;

Figure 7:
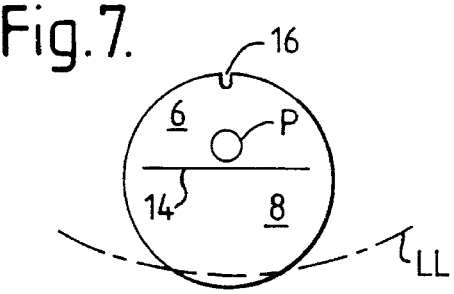
Figure 8:
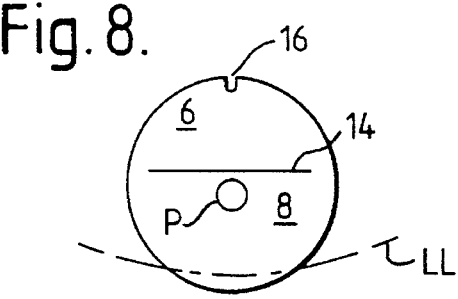

FIG. 7 schematically illustrates the relative positions of lens and pupil in the distance-vision mode;

FIG. 8 is a similar representation, relating to the near-vision mode, and

Figure 9:
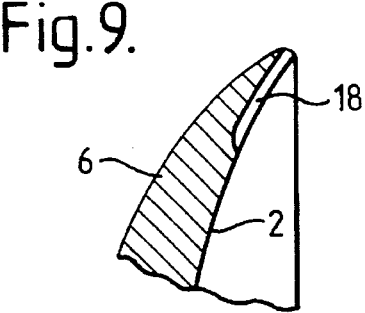

FIG. 9 illustrates another form of the tear-escape aperture.

DETAILED DESCRIPTION OF THE INVENTION

Figure 1:
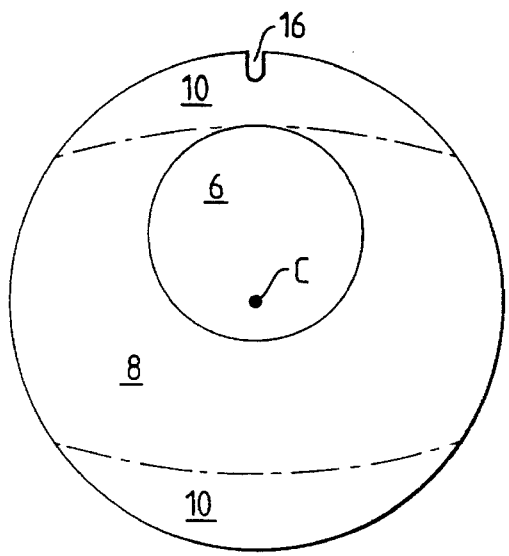
Figure 2:
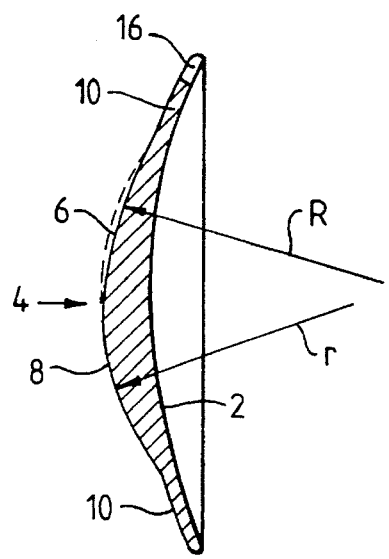

Referring now to the drawings, there is seen in FIGS. 1 and 2 a bifocal contact lens according to the invention. While the rear surface 2 is of the conventional type, either spherical or a surface of revolution generated by a conic section or a combination of conic sections, the front surface 4 is comprised of two contiguous segments: an upper segment 6, optically configured to serve for distance vision, and a lower segment 8, optically configured to serve for near vision. Two limited, peripheral, optically non-active zones 10 of a different curvature have the only purpose of narrowing the upper and lower edges 12 of the lens, to reduce the step to be encountered by the blinking eyelids. FIG. 2 also shows the radius of curvature R of the distance-vision segment 6 and the radius of curvature r of the near-vision segment 8. The dotted line in the upper part of the lens indicates the original surface of the segment 8 which has been machined to produce the segment 6. The material removed in this process causes the center of gravity of the lens to be shifted below its geometrical center C, contributing to the orientational stability of the lens.

On top of the lens, there is seen a small notch 16 which, in a way to be explained further below, is instrumental in maintaining the lens in its correct position, in which the distance-vision segment 6 is the upper segment, the near vision segment 8 is the lower segment, and the lens diameter passing through the notch 16 is substantially vertical.

Figure 3:
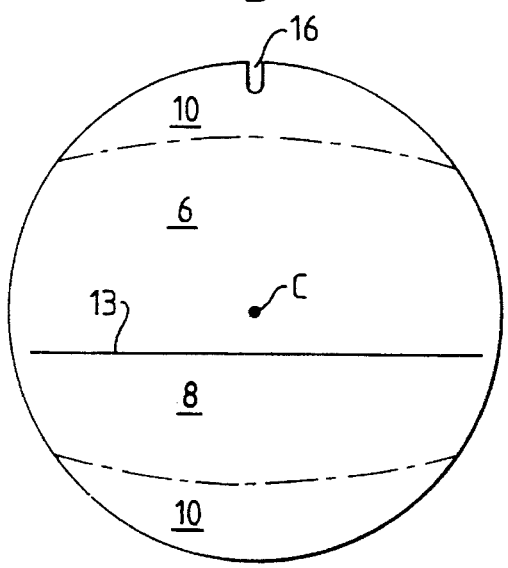
Figure 4:
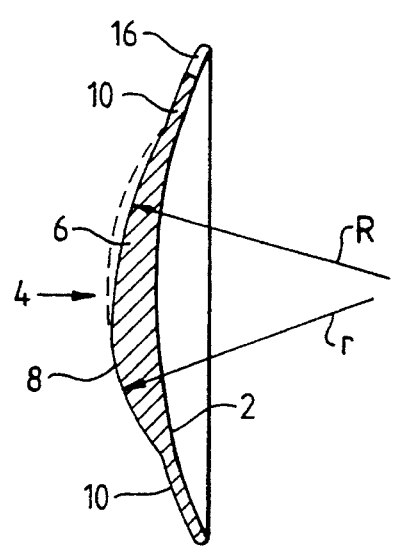

FIGS. 3 and 4 illustrate another embodiment of the bifocal contact lens according to the invention. In this embodiment, the distance-vision segment 6 subtends a wider angle (thus providing a wider field of distance vision) and intersects with the near-vision segment 8 along what in the frontal view of FIG. 3 appears as a substantially horizontal line 13. The cross-sectional view of FIG. 4 is analogous to the view of FIG. 2.

Figure 5:
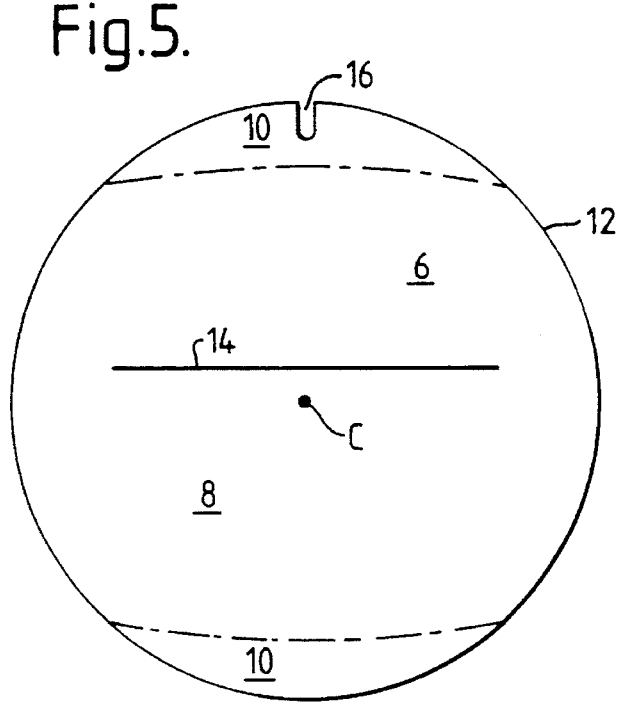
Figure 6:
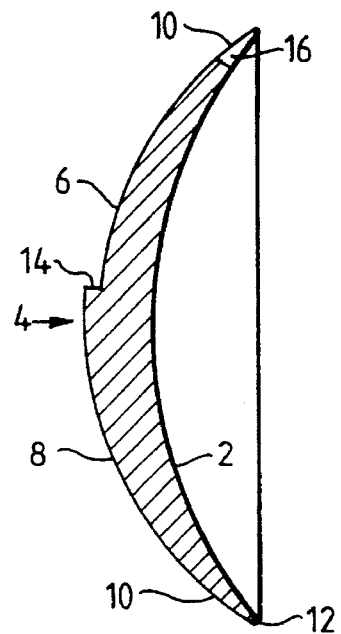

The bifocal contact lens illustrated in FIGS. 5 and 6 differs from those shown in FIGS. 1 and 3 in that the transition from one segment to the other is in the form of a step 14 which is configured as shown in FIG. 2, but may also be a slanted chamfer or a fillet. As seen in FIG. 6, the near-vision segment 8 is thicker, and therefore heavier, than the distance-vision segment 6, bringing the center of gravity of the lens below its geometrical center C, contributing to the orientational stability of the lens, even if the step 14 were situated at its central diameter. For added stability, the step 14 may be positioned above the center C, as shown in FIGS. 5 and 6.

The mechanism of alternating bifocal vision is explained with the aid of FIGS. 7 and 8, in which the letter P designates the pupil and LL, the lower eyelid.

FIG. 7 illustrates the relative position of pupil and lens for distance vision and FIG. 8 does the same for near vision. In both situations the lens is seen to rest not on, but behind, the lower eyelid LL, in the so-called conjunctival sac, with the lens diameter such that, when looking straight forward into the distance, the pupil P will be located, as shown in FIG. 7, within, or rather behind, the distance-vision segment 6. When now the user looks downwards ("downgazing"), the lens cannot follow the downward motion of the cornea, since, as indicated above, it rests in the conjunctival sac. Therefore, the cornea and, with it, the pupil P, move against a stationary lens, until the pupil P is entirely behind the near-vision segment 8 of the lens, as seen in FIG. 8.

The movement of the lens with respect to the cornea and pupil, whether relative or absolute, is called lens translation and takes place in several situations:

1) During blinking, and depending on eyelid pressure, the lens is pulled up by the upper eyelid when the latter opens upon blinking, and slides down the cornea by force of gravity when the eyelid has completed the opening movement.

2) In transition between the distance-vision position and the near-vision position, as explained above.

3) In transition between the near-vision position and the distance-vision position, when the lens is first dragged along by the up-looking cornea and then has to slide down by gravity to its rest position behind the lower eyelid LL, so that the pupil P will come to be located behind the distance-vision segment 6.

It is during these sliding episodes that, with the prior art bifocal lenses, angular dislocation is liable to occur and that, with the present lenses, the above-mentioned notch 16 exerts its stabilizing and righting effect.

The lens is not in direct contact with the cornea, but floats on a very thin film of tears interposed between the cornea and the lens rear surface 2. The notch 16 acts as a preferred escape aperture for parts of the tear film displaced when the lens slides along the cornea. The flow of tears through this aperture produces lateral force components acting on the lateral parallel walls of the notch 16. These lateral components cancel out when the direction of sliding and the direction of the notch 16 coincide, but produce a righting moment when these directions do not coincide. Thus when, due to various factors, the lens, at the beginning of its sliding translation (which, because of gravity, takes place in a substantially vertical direction), is angularly displaced, say, by 30° in the clockwise sense, the tears escaping though the notch 16 act on the left wall of the notch 16 and will cause the lens to be rotated by 30° in the counterclockwise sense, at which point the righting moment becomes zero, due to the now-achieved coincidence of the direction of sliding and the direction of the notch 16. The latter is also instrumental in enhancing aand optimizing, e.g., maximizing, the sliding translation.

Another possible shape of the escape aperture is shown in FIG. 9 and has the form of a groove 18 provided in the rear surface 2. The effect is the same as with the notch 16. It is also possible to provide more than one escape aperture, whether notch or groove. In this case, the escape apertures must be arranged in symmetry with respect to the vertical center line of the lens.

It is also possible to provide the near-vision segment 8 with two or more zones of different refractive power, in order to also obtain middle-distance vision at the zone or zones close to the border between the two segments 6, 8. It is also envisaged to arrange at least the near-vision segment to have continuously. variable power for extended multifocality.

It will be appreciated that the term "multifocal" as used in this specification also includes "bifocal".

What is claimed is:

1. A multifocal contact lens, comprising an outer edge, a rear surface configured to float on a tear film covering the user's cornea and a front surface comprised of at least two contiguous surface segments, an upper surface segment optically configured to serve for distance vision and a lower surface segment optically configured to serve for near vision, characterized in that, in at least one peripheral zone of said lens there is provided at least one recess constituting a preferred escape aperture for parts of said tear film displaced when said contact lens slides down the user's cornea, said escape aperture being located in said peripheral zone of said rear surface and opening onto said outer edge of said lens, to the effect of substantially preventing rotation of said contact lens during lens translation, as well as of optimizing said translation.

2. The contact lens as claimed in claim 1, wherein said at least one escape aperture is provided in the peripheral zone of said upper surface segment.

3. The contact lens as claimed in claim 1, wherein said escape aperture is in the form of at least one notch cut in said peripheral zone.

4. The contact lens as claimed in claim 1, wherein said escape aperture is in the form of at least one groove cut in the peripheral zone of said rear surface, said groove opening onto the edge of said lens.

5. The contact lens as claimed in claim 1, wherein, with said lens in position of use, the border between said upper surface segment and said lower surface segment is defined by the outline of said upper surface segment.

6. The contact lens as claimed in claim 1, wherein, with the lens in position of use, the border between said upper surface segment and said lower surface segment is located in a substantially horizontal plane.

7. The contact lens as claimed in claim 6, wherein said border is a shoulder-like step produced by said lower surface segment projecting, at said border, beyond said upper surface segment.

8. The contact lens as claimed in claim 6, wherein, with said. lens in position of use, the center of gravity of said lens is located below the geometrical center of said lens.

9. A multifocal contact lens, comprising an outer edge, a rear surface configured to float on a tear film covering the user's cornea and a front surface comprised of at least two contiguous surface segments, a lower surface segment optically configured to serve for near vision and an upper surface segment having an uppermost area relative to said lower surface segment and optically configured to serve for distance vision, characterized in that, in at least one peripheral zone of said lens there is provided at least one escape aperture for parts of said tear film displaced when said contact lens slides down the user's cornea, said escape aperture being located in said peripheral zone of said rear surface and having two parallel sidewalls extending radially inward from said outer edge of said lens, to the effect of substantially preventing rotation of said contact lens during lens translation, as well as of optimizing said translation.

10. The contact lens as claimed in claim 9, wherein said at least one escape aperture is provided in the peripheral zone of said upper surface segment in said uppermost area.

\* \* \* \* \*